(12) United States Patent
Aoyama et al.

(10) Patent No.: US 7,291,801 B2
(45) Date of Patent: Nov. 6, 2007

(54) ELECTRODE FOR PROJECTION WELDING

(75) Inventors: Yoshitaka Aoyama, Sakai (JP); Shoji Aoyama, Sakai (JP)

(73) Assignee: Yoshitaka Aoyama, Osaka (JP)

( * ) Notice: Subject to any disclaimer, the term of this patent is extended or adjusted under 35 U.S.C. 154(b) by 17 days.

(21) Appl. No.: 10/521,547

(22) PCT Filed: Jul. 17, 2003

(86) PCT No.: PCT/JP03/09135

§ 371 (c)(1),
(2), (4) Date: Jul. 18, 2005

(87) PCT Pub. No.: WO2004/009280

PCT Pub. Date: Jan. 29, 2004

(65) Prior Publication Data

US 2005/0284847 A1    Dec. 29, 2005

(30) Foreign Application Priority Data

Jul. 20, 2002    (JP)    ............................ 2002-242708

(51) Int. Cl.
*B23K 11/14*    (2006.01)
(52) U.S. Cl. .......................................... 219/93; 219/89
(58) Field of Classification Search ................ 219/93, 219/119, 120, 86.31, 89
See application file for complete search history.

(56) References Cited

U.S. PATENT DOCUMENTS

| | | | | |
|---|---|---|---|---|
| 3,657,509 | A | * | 4/1972 | Beneteau ..................... 219/120 |
| 3,909,581 | A | * | 9/1975 | Stone et al. ................. 219/120 |
| 5,705,784 | A | | 1/1998 | Aoyama et al. |
| 5,895,584 | A | * | 4/1999 | Sakota ..................... 219/86.24 |
| 6,008,463 | A | * | 12/1999 | Aoyama et al. ............. 219/119 |

FOREIGN PATENT DOCUMENTS

| | | | |
|---|---|---|---|
| JP | 57-29996 | | 2/1982 |
| JP | 59-68688 | | 4/1984 |
| JP | 8-1353 | * | 1/1996 |
| JP | 08-1353 | | 1/1996 |
| JP | 10-118775 | | 5/1998 |

* cited by examiner

*Primary Examiner*—Len Tran
(74) *Attorney, Agent, or Firm*—J.C. Patents

(57) ABSTRACT

In an electrode for projection welding, an end cover (10) of metal having a through hole (19) is attached to the end of a main body (6) of metal having a cylindrical shape, a guide sleeve (12) of insulation material is disposed in the main body (6), the end of the guide sleeve (12) being formed with a receiving hole (18) for a part (2) in a state in which the receiving hole (18) communicates with the through hole (19) in the end cover (10), and a cooling passage (32) for fluid which cools the guide sleeve (12) is formed.

8 Claims, 4 Drawing Sheets

ELECTRODE FOR PROJECTION WELDING

BACKGROUND ART

This invention relates to an electrode for projection welding, utilized in a field where a shaft-like part such as a bolt is inserted in an electrode receiving hole and welded.

FIG. 1 is a view showing an embodiment of the invention, but the prior art will be described using this figure. The attaching portion of an electrode collectively indicated by the reference numeral 1 is formed with a cooling hole 13 into which cooling water is introduced; the cooling water which has flowed thereinto flows back as shown by an arrow. An end cover 10 to which heat is directly transmitted during welding is positioned at a place remotest from the cooling hole 13. Further, inserted in the main body 6 is a guide sleeve 12 made of non-metallic material made of synthetic resin.

When the end cover 10 which becomes hottest in the entire electrode is isolated greatly from the cooling hole 13, as described above, the cooling action is not very effective for the end cover 10. If the end cover 10 is placed under high temperature, a phenomenon develops in which the pressing during welding will cause the flange 4 of a part to cut into the surface of the end cover 10, forming a dent in the shape of the flange 4 in the end cover 10. Therefore, the durability of the end cover 10 decreases, resulting in a short cycle of replacement of the end cover 10, greatly increasing the frequency of stoppage of the production line for replacement purposes, leading to a decrease in productivity, and to uneconomicality in the cost of replacement parts.

Further, the guide sleeve 12, which is made of non-metallic material such as synthetic resin, requires sufficient cooling in terms of heat.

Further, although various methods are known in which a shaft-like part such as a projection bolt advanced into a receiving hole in an electrode is electrically detected to ascertain the presence of a part in a normal manner, it is necessary to realize such detection by a more reliable technique.

DISCLOSURE OF THE INVENTION

According to an embodiment of the invention, an electrode for projection welding has an end cover made of metal and having a through hole and attached to the end of a cylindrical main body made of metal, and a guide sleeve made of insulation material is disposed in said main body, the guide sleeve having a part receiving hole formed in the end thereof in a state communicating with the through hole in said end cover, and a cooling passage for fluid is formed for cooling the guide sleeve. As a result, a cooling passage for cooling the guide sleeve is disposed nearer to the end cover; therefore, the welding heat the end cover has received is transmitted to the cooling passage more positively, thereby preventing the end cover from obtaining abnormally high temperatures, greatly reducing the recessing phenomenon in the end cover surface. Further, the welding heat transmitted to the guide sleeve is also effectively transmitted to the cooling passage and cooled, thereby preventing thermal degradation or the like of the guide sleeve made of non-metallic material such as synthetic resin.

The fluid may be cooling water, and the cooling passage may be in the form of an annular groove extending circumferentially of the main body. The flowing of the cooling water through the annular groove extending circumferentially of the main body provides sufficient cooling effects. Particularly, because of the circumferential cooling passage, the heat transmitted from the end cover necessarily passes through this cooling passage, where the heat is effectively taken away; thus, reliable cooling is carried out.

The cooling passage may be formed in the outer periphery of the guide sleeve. This ensures that the guide sleeve made of non-metallic material such as synthetic resin having low thermal durability is positively cooled and thereby protected against harmful thermal influences. At the same time, since it follows that the cooling passage is disposed in a place nearer to the end cover, the cooling effect on the end cover is also improved.

A magnet may be disposed in the guide sleeve so that a part inserted in the receiving hole in the guide sleeve through the through hole in the end cover is attracted by the magnet, whereby the part is held with respect to the electrode. In this case, in whichever direction the electrode faces, there is no possibility of the part inserted in the receiving hole accidentally slips off; thus, an exact welding operation is attained.

It may be arranged that the detection current by the part detection flows at least through the magnet, part, end cover and main body. In this case, since the part is also in contact with the inner surface of the through hole in the end cover, the detection current flows at least through the magnet, part, end cover and main body, so that the presence or absence of the part can be reliably detected.

BEST MODE FOR CARRYING OUT THE INVENTION

Figure 1:
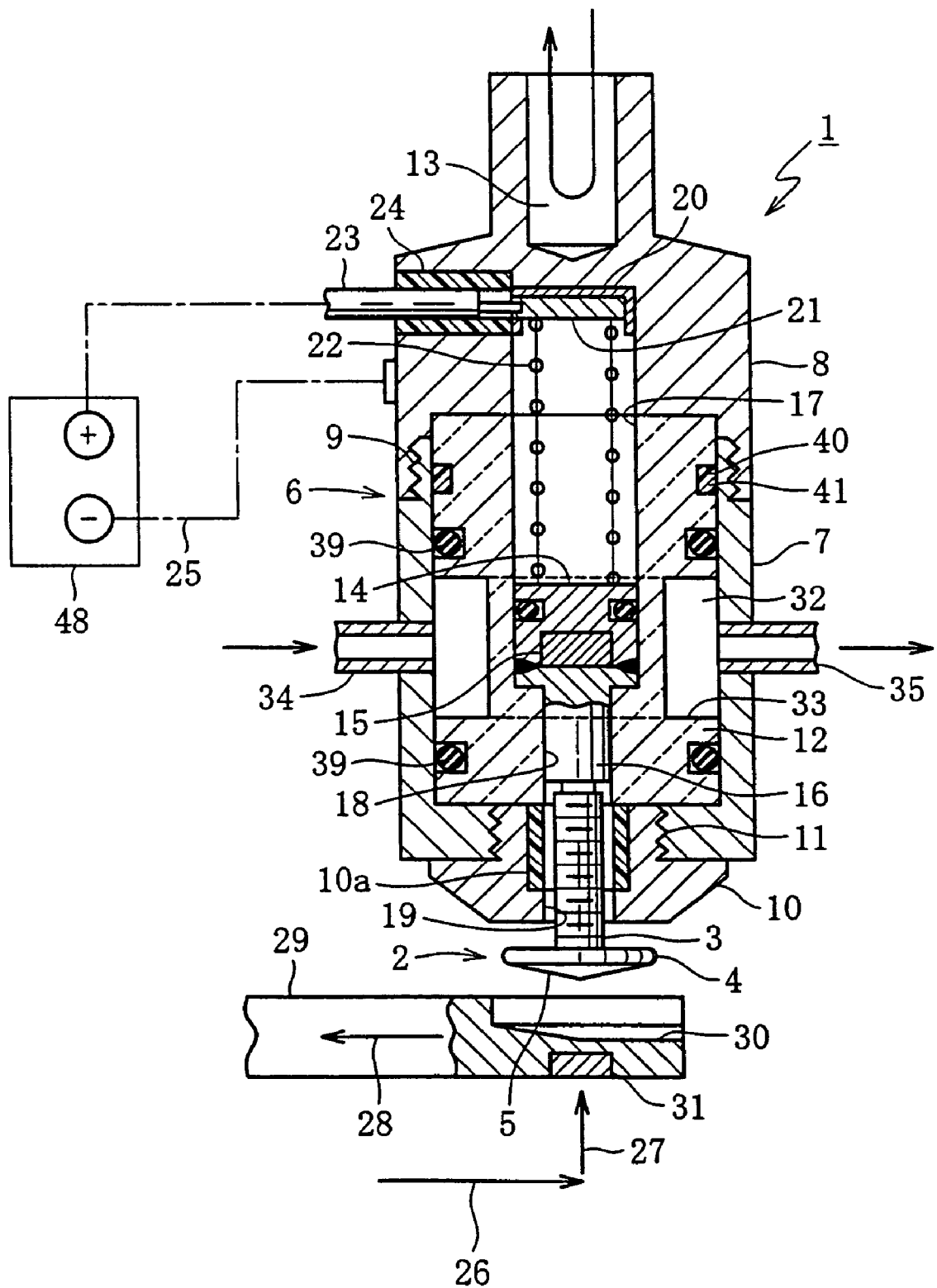
FIG. 1 is a longitudinal sectional view of an electrode, showing an embodiment of the invention.

First, an embodiment shown in FIG. 1 will be described. A part 2 in this case is a projection bolt composed of a stem 3, flange 4 and a welding projection 5. The main body 6 of an electrode 1 is composed of a welding-side member 7 of copper-chromium alloy and a fixed-side member 8 also of copper-chromium alloy, which are decomposably joined together by a threaded section 9. An end cover 10 of beryllium copper is removably attached to the front end of the welding-side member 7 by a threaded section 11. In addition, the reference character 10a denotes an insulation sleeve mounted in a through hole 19 in the end cover 10. As already described, the fixed-side member 8 is provided with a cooling hole 13 in the end.

The main body 6 is circular in cross section and has a cylindrical guide sleeve 12 inserted therein. The guide sleeve 12 is made of insulation material, for example, Bakelite, polyamide or PTFE. The guide sleeve 12 has a through hole consisting of a major diameter section 17 and a minor diameter section 18. A container 14 for a magnet is slidably received in the major diameter section 17, while a guide pin 16 of iron is slidably received in the minor diameter section 18. The container 14 has a magnet (permanent magnet) 15 embedded therein. The container 14 and guide pin 16 are welded together, with the guide pin 16 in close contact with the magnet 15. The minor diameter section 18 plays a role as a receiving hole for the stem 3 of the part 2 (hereinafter the minor diameter section being referred to also as the receiving hole 18), and a through hole 19 in the end cover 10 is coincident (communicating) with the receiving hole 18. The inner diameter of the through hole 19 is set slightly larger than the outer diameter of the stem 3, dimensions being set so that the shaft 3 comes in contact with the inner surface of the through hole 19.

The fixed-side member 8 has a hole communicating with a through hole (17) in the guide sleeve 12 and has fitted therein an insulation cup 20 of insulation material (for example, PTFE) which receives a conductive washer 21 in its bottom. Interposed between the washer 21 and the container 14 is a compression coil spring 22, urging with its elastic force the container 14 downward in the figure and the washer 21 upward in the figure. An electric wire 23 is connected to the washer 21 and extends through an insulation tube 24 until it is lead out to the outside. Another electric wire 25 is connected to the main body 6 (fixed-side member 8). These electric wires 23 and 25 are connected to a detector 46.

There are various means for supplying the bolt 2 to the receiving hole 18, but in this case a supply rod 29 having square motions indicated by arrows 26, 27 and 28 is shown by way of example. The end of the supply rod 29 is formed with a recess 30 opened to the front for receiving the flange 4 therein, and a magnet 31 is embedded in the bottom of the recess 30 for holding the bolt 2.

A cooling passage 32 through which cooling fluid passes extends circumferentially of the main body 6. In the case of the embodiment shown in FIG. 1, the cooling passage 32 is provided by an annular groove 33 formed around the outer periphery of the guide sleeve 12. The annular groove 33 is positioned in the area around the center of the axial length of the guide sleeve 12. An inlet pipe 34 and an outlet pipe 35 are attached to the welding-side member 7 to supply cooling water to the annular groove 33 and discharge it therefrom. The reference character 39 denotes an O-ring for sealing off cooling water between the guide sleeve 12 and the main body 6. Further, at a place nearer to the end of the guide sleeve 12 on the washer 21 side is formed a circumferential seal groove 40, which is filled with an adhesive agent 41. This ensures that even if cooling water passes the O-ring 39 by any chance, it is reliably prevented from passing through the clearance to reach the washer 21. If a short circuit is established which extends from the washer 21 to the fixed-side member 8 via the compression coil spring 22 to pass electricity to the fixed-side member 8, this leads to a malfunction such that although the bolt 2 has not been inserted correctly in the receiving hole 18, the bolt 2 appears so inserted.

The supply rod 29 holding the part 2 in the recess 30 makes motions indicated by the arrows 26 and 27 so that the stem 3 of the bolt 2 is inserted in the receiving hole 18 through the through hole 19 and subsequently the supply rod 29 returns in the direction of the arrow 28. The bolt 2 is attracted strongly to the guide pin 16 through the magnetic force of the magnet 15. This attraction establishes an electricity-passing path extending from the electric wire 23 to the electric wire 25 via the washer 21, compression coil spring 22, container 14 (magnet 15), guide pin 16, bolt 2, inner surface of the through hole 19, and main body 6. Such passing of electricity detects the presence of the bolt 2 in the receiving hole 18.

If the bolt 2 is not present in the receiving hole 18 or has not normally advanced to the innermost of the receiving hole 18, then no electric contact between the bolt 2 and the guide pin 16 is established, so that said electricity-passing path is not formed; therefore, a detection signal indicating presence of a part is not emitted. It is arranged that with this non-emission of a detection signal used as a trigger, no stroke operation of the electrode not be effected.

If the flange 4 is pressed against the mating member, for example, a steel plate part (not shown) in a state in which the bolt 2 is attracted to the guide pin 16, the magnet 15 (container 14) slides in the major diameter section 17 against the force of the compression coil spring 22, whereby the flange 4 closely contacts the surface of the end cover 10, subsequently passing welding electricity, causing the projection 5 to be welded to the mating member.

As a result of cooling water passing in the groove 33, the heat transmitted from the flange 4 to the guide sleeve 12 via the end cover 10 and welding-side member 7 is cooled by the cooling water flowing in the annular groove 33, preventing overheating of the guide sleeve 12 and degradation or the like of the synthetic resin. Further, since the annular groove 33 is positioned in a place nearer to the end cover 10, the welding heat is effectively cooled to make it hard for a recess to form in the end surface of the end cover 10, thus improving the durability of the end cover 10, a fact which is effective for line stoppage or cost saving for parts replacement as described above. That is, the cooling passage 32 effectively cools both the end cover 10 and the guide sleeve 12.

Figure 2:
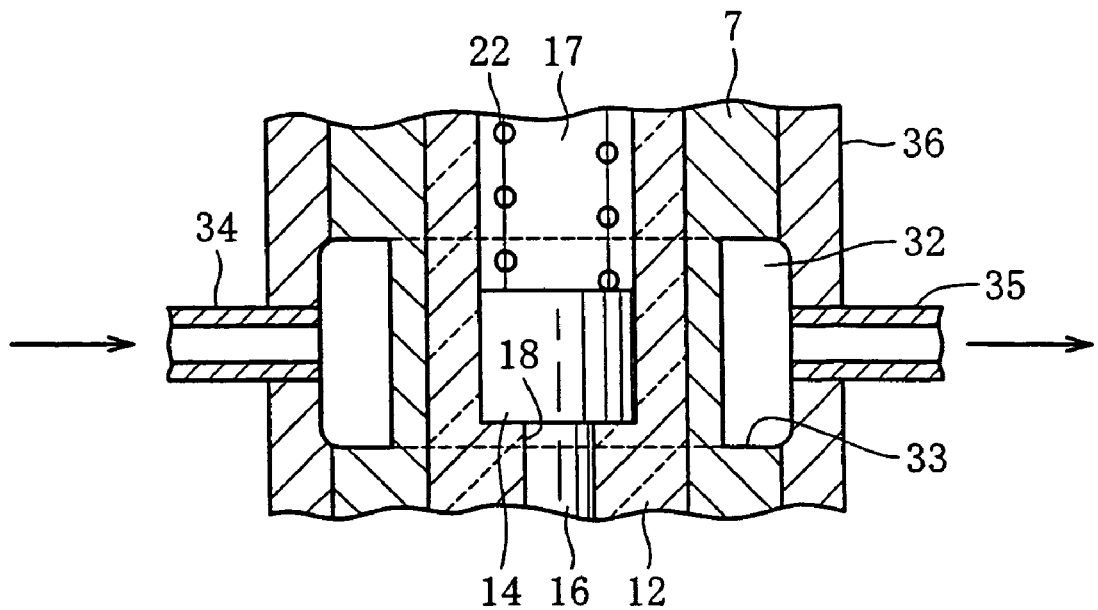
FIG. 2 is a partial longitudinal sectional view, showing a modification of a cooling passage.

FIG. 2 shows a modification wherein an outer sleeve 36 is disposed on the outside of the welding-side member 7 and is formed with a cooling passage 32 (annular groove 33) similar to the one shown in FIG. 1. The rest of the arrangement is the same as in FIG. 1, and members with like functions are indicated by like reference characters. The cooling action is also the same as in FIG. 1.

Figure 3:
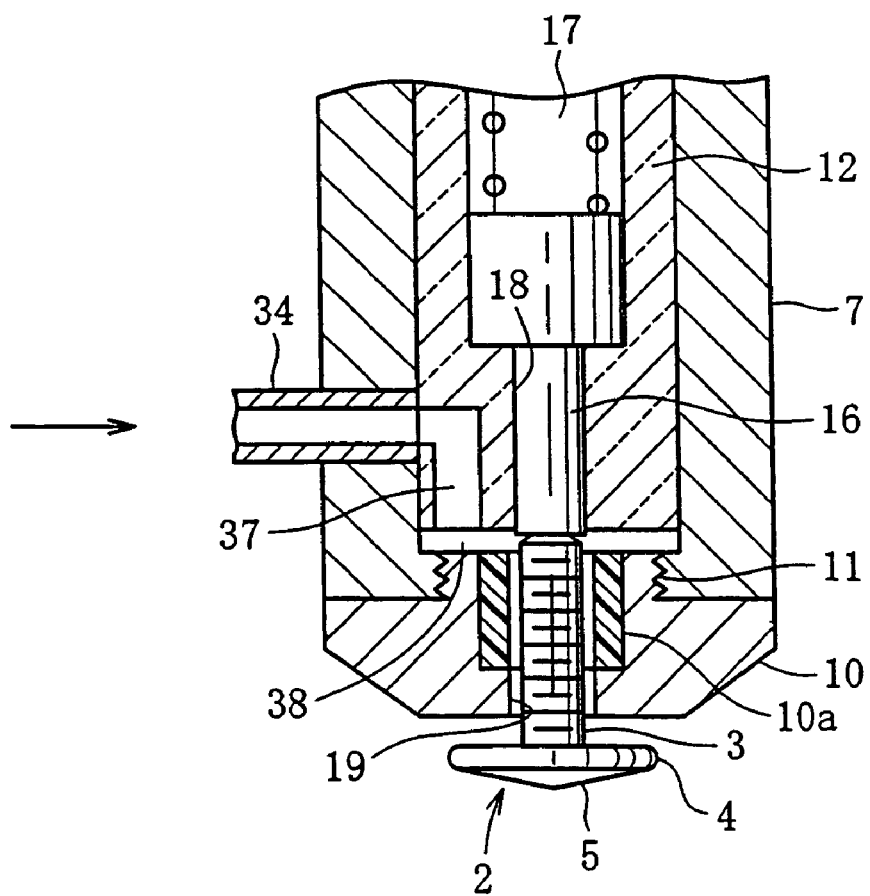
FIG. 3 is a partial longitudinal sectional view, showing another embodiment of the invention.

An embodiment shown in FIG. 3 uses air as the cooling fluid, wherein a cooling passage is defined by an air passage 37 formed in the guide sleeve 12, a clearance 38 between the guide sleeve 12 and the end cover 10, and the through hole 19. The air flowing in from an inlet pipe 34 is discharged from the through hole 19 via the air passage 37 and clearance 38, thereby performing the cooling of the guide sleeve 12 and end cover 10. The rest of the arrangement is the same as in the embodiment shown in FIG. 1, and members with like functions are indicated by like reference characters. The cooling action is also the same as in the embodiment shown in FIG. 1.

Figure 4:
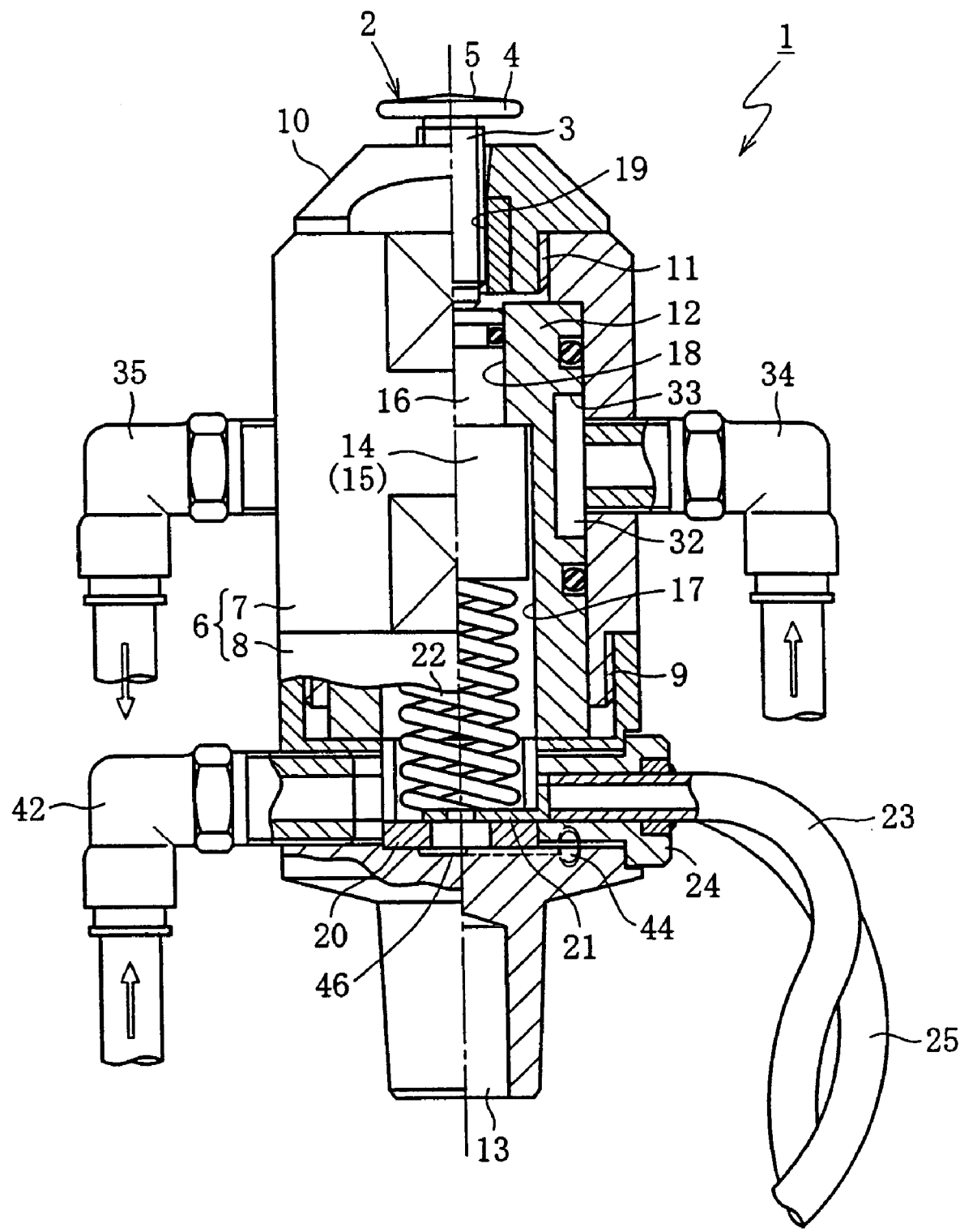
FIG. 4 is a longitudinal sectional view of an electrode, showing yet another embodiment of the invention.
Figure 5:
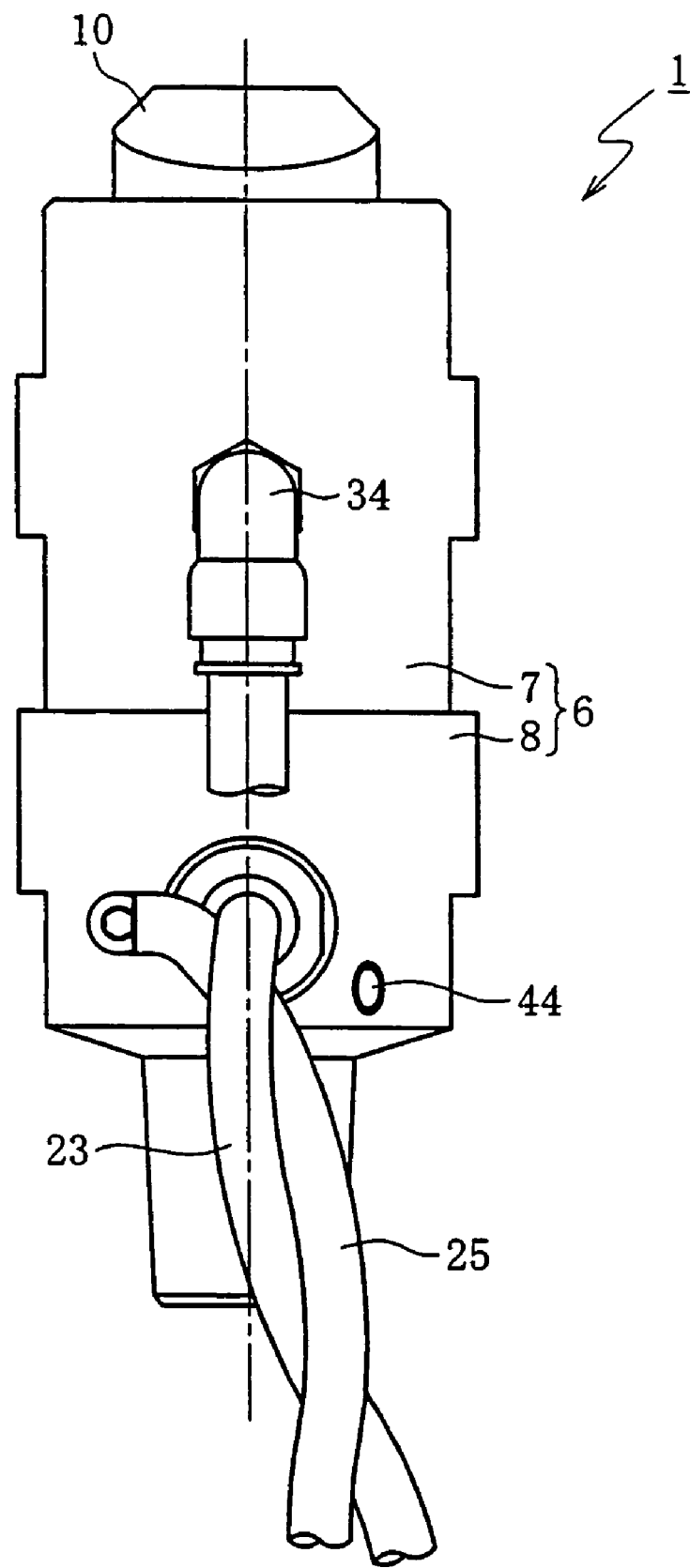
FIG. 5 is a side view of the electrode of FIG. 4.

An embodiment shown in FIGS. 4 and 5 corresponds in basic arrangement to an upside-down form of the electrode shown in FIG. 1. Further, this embodiment is provided with an air piping 42 and a drain hole 44. Throughgoing holes are provided in the bottom of the insulation cup 20 and washer 21, and a recess 46 formed in the main body 6 (fixed-side member 8) provides communication between the throughgoing hole in the insulation cup 20 and the drain hole 44. Therefore, the air piping 42 and the drain hole 44 communicate with each other. Blowing compressed air into the air piping 42 causes the water and the like collecting therein to discharge through the drain hole 44. Water or the like entering the electrode may cause the danger of shorting of the detection circuit. Possible causes of wetting the electrode with water include the operator's carelessness to spill water, and the cooling water for the upper electrode. That is, though illustration is omitted, if the electrode 1 shown in FIG. 4 is a lower electrode, then an upper electrode is positioned thereabove. In the case where such upper electrode has a water-cooled type cooling passage as shown in FIG. 1, disassembling the main body of the upper electrode results in the water in the cooling passage dropping onto the lower electrode.

What is claimed is:

1. An electrode for projection welding comprising
   a metallic main body,
   an end cover of metal attached to the end of a main body and having a through hole,
   and a guide sleeve of insulation material received in said main body and having a part receiving hole communicating with the through hole in the end cover, and having an annular groove formed around an outer periphery along an axial length of the guide sleeve,
   wherein a cooling passage is provided by the annular groove along an entire axial length of the annular groove for fluid to cool said guide sleeve, wherein said fluid is water, and said cooling passage extends circumferentially of the main body and has an inlet port and an outlet port for cooling water.

2. An electrode for projection welding as set forth in claim 1, wherein said guide sleeve has a throughgoing hole consisting of a major diameter section and a minor diameter section, a container internally holding a magnet is slidably received in the major diameter section, a guide pin of iron is slidably received in the minor diameter section, the end of said container with the magnet exposed being joined to said guide pin, a compression coil spring acts on the other end of said container, said minor diameter section being used as said receiving hole.

3. An electrode for projection welding as set forth in claim 1, wherein said cooling passage is in the form of an annular groove formed around the outer periphery of said guide sleeve.

4. An electrode for projection welding as set forth in claim 1, wherein a magnet is inserted in said guide sleeve, so that a part inserted in the receiving hole in the guide sleeve from the through hole in said end cover is attracted by the magnet, whereby the part is held to the electrode.

5. An electrode for projection welding as set forth in claim 4, wherein a detection current for parts detection flows through at least said magnet, said part, said end cover, and said main body.

6. An electrode for projection welding as set forth in claim 2, wherein an electric wire is connected to a washer receiving the end of said compression coil spring opposite to said container, an insulation cup is interposed between the washer and the main body, and an electricity-passing circuit is established with a path including the washer, compression coil spring, container, guide pin, part, end cover and main body.

7. An electrode for projection welding as set forth in claim 1, wherein an air piping and a drain hole communicating with each other are provided for blowing compressed air into the main body.

8. An electrode for projection welding as set forth in claim 1, wherein said fluid is supplied from an inlet formed in the main body and is discharged outside through an air passage formed in the guide sleeve, a clearance between the guide sleeve and the end cover, and the through hole in the end cover.

* * * * *